June 14, 1960    EIJI NIKI    2,941,142

DERIVATIVE POLAROGRAPH BY THE ALTERNATING CURRENT BRIDGE METHOD

Filed April 19, 1955

INVENTOR:
EIJI NIKI

United States Patent Office 2,941,142
Patented June 14, 1960

2,941,142

DERIVATIVE POLAROGRAPH BY THE ALTERNATING CURRENT BRIDGE METHOD

Eiji Niki, 882 1-Chome Nakameguro, Meguro-ku, Tokyo, Japan

Filed Apr. 19, 1955, Ser. No. 502,480

1 Claim. (Cl. 324—31)

The present invention relates to a derivative polarographic instrument by employing an alternating current bridge. More particularly the invention relates to a method of obtaining a derivative polarogram wherein an alternating current bridge is formed of an electrolytic cell having a fine electrode for polarography, standard resistance, a sliding variable resistance including a wiper member and a fixed resistance so as to add to the electrolytic cell a feeble constant alternating current voltage as superimposed on a direct current voltage in the ordinary polarography, the direct current voltage being changed by a motor and, when the voltage reaches a voltage where an electrolytic current just starts flowing in the ordinary polarogram, the degree of electric conductivity which varies suddenly is measured and thereby the direct current voltage and the degree of electric conductivity are recorded on the abscissa and the ordinate, respectively.

When the degree of electric conductivity of the electrolytic cell varies, the balance of the alternating current bridge will be broken. The unbalanced output current is amplified. A two-phase balancing motor is driven by the output from the amplifier. As soon as the bridge is thus balanced by the balancing motor, the degree of electrolytic conductivity is recorded on recording paper moving synchronously with the motor for increasing said direct current voltage. Thus a derivative polarogram can be quickly and accurately recorded with a pen and a chemical analysis can be easily carried out.

A chemical analysis used to be carried out by means of an S-shaped curve drawn by the variation of the electrolytic current in respect of the relation between the direct current voltage and the direct current in the ordinary polarography. In such case, the measurement of limiting currents in the comparatively high residual currents, the measurement of the wave height of the diffusion currents of the post-discharge substance among many pre-discharge ions and the separation of half-wave potentials of more than two substances wherein electrolysis occurs closely are not easily readable and have been so incomplete that the result of the analysis has been inevitably incorrect.

The present invention relates essentially to measuring by the alternating current bridge the electrical conductivity of the electrolytic cell containing a fine electrode such as a dropping mercury electrode. The derivative of the electrolytic current is thus obtained by using a slight alternating current voltage in the measurement. Further, a condenser is also used, as required, to known accurate electric conductivity and the variation of the capacity of a fine electrode is thus corrected.

Fig. 1 of the accompanying drawing is a wiring diagram of the alternating current bridge embodying the present invention.

Figure 1:
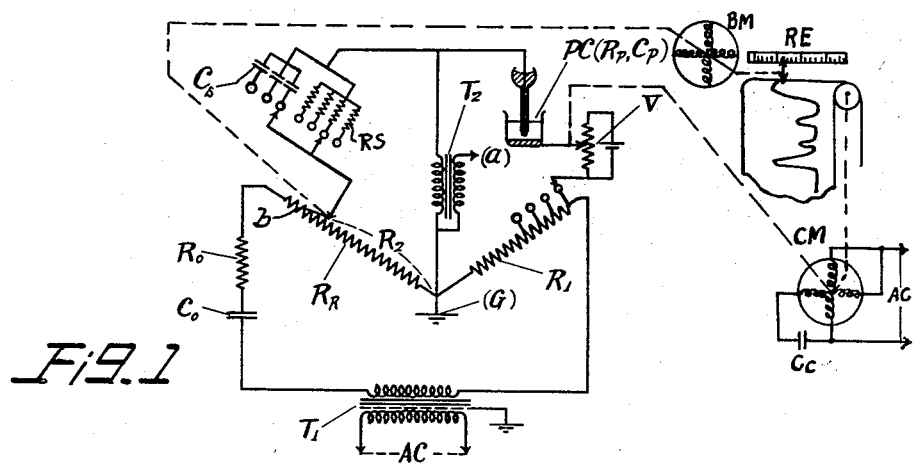

In the alternating current bridge of Fig. 1, an ordinary current source frequency of 50 or 60 cycles is used and an electric current is passed by keeping the output from electric source transformer $T_1$ in proper phase by condenser $C_0$ and resistance $R_0$. The numerical values of $C_0$ and $R_0$ are so selected as to just cross at a right angle to another phase entering the balancing motor when the output from the low frequency amplifier enters the two-phase balancing motor.

The bridge is formed of resistances $R_1$, $R_2$ and $R_s$ and an electrolytic cell. Now, if the bridge is balanced, that is, if no current flows through input transformer $T_2$, the following relation will be established:

$$R_2/R_s = R_1/R_p \tag{1}$$

wherein $R_p$ is the internal resistance of the electrolytic cell, $R_1$ is the standard resistance (half fixed), $R_s$ is the standard resistance (variable), $R_R$ is the sliding resistance of the recorder and $R_2$ is the resistance between touching point $b$ and earth point G.

Formula 1 can be transformed as follows:

$$R_2 = R_s R_1 \cdot 1/R_p \tag{2}$$

That is to say, $R_2$ is proportional to the reciprocal number of the internal resistance of the electrolytic cell or, in other words, to the electric conductivity of the electrolytic cell.

Usually, the jumping point of the S-shaped curve of the polarogram ranges from 0.05 to 0.2 v. in the direct current voltage. Therefore, if a feeble voltage is used in measuring the electric conductivity and the alternating current voltage on the electrolytic cell is made lower than about 50 mv., the derivative of an ordinary polarogram can be obtained.

In the present instrument, by varying $R_1$ and the magnitude of the alternating current flowing in series through $R_1$ and $R_R$, the alternating current voltage on the electrolytic cell can be varied in the range of 1 to 100 mv. and a correct derivative curve corresponding thereto can be obtained.

In Fig. 1, V is a potentiometer for the motor CM for direct current voltage and is synchronized or connected with the motor CM for moving recording paper off the recording means RE for obtaining a derivative polarogram. The direct current closed circuit passes through the electrolytic cell, the primary side and $R_1$ and back to V or passes through the electrolytic cell, $R_s$, $R_2$ and $R_1$ and back to V. The sliding resistance of V is chosen so low as to be negligible as compared with $R_p$.

$C_s$ is a condenser of the order of several $\mu f.$, is to correct the capacity variation of the fine electrode as required and is of the same order as the capacity of electrolytic cell $C_p$. The unbalanced current of the bridge thus obtained will enter transformer $T_2$ and enter the amplifier through $a$, being thus amplified.

Figure 2:
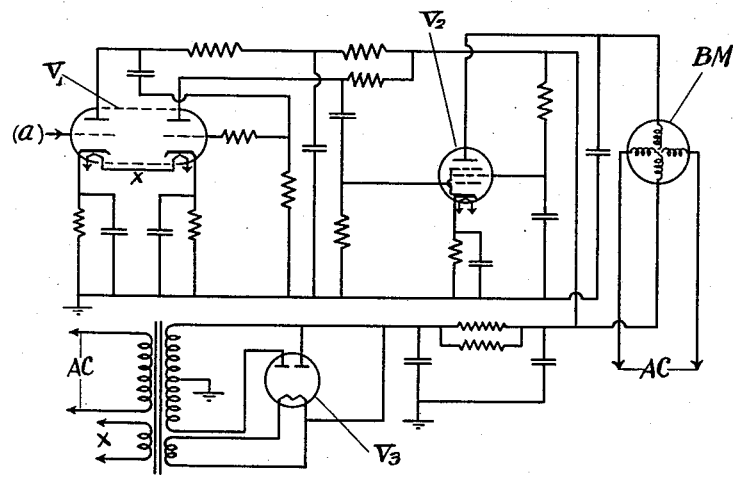
Fig. 2 illustrates an amplifying circuit of the same and a circuit of a two-phase balancing electric motor.

Fig. 2 shows an example of a low frequency amplifier used in the present instrument. The input from above $a$ will be amplified by the vacuum tubes of $V_1$ and $V_2$. The output of $V_2$ will enter the one phase of the two-phase balancing motor. If the capacity part of the bridge is almost balanced, the imaginary number part of the output current can be neglected and therefore the torque of the balancing motor will be produced as the output of the above-mentioned amplifier crosses almost at right angle to the other phase of the two-phase balancing motor. Balancing motor BM and sliding part $b$ of the sliding resistance are connected with each other in the direction balancing the bridge according to the direction of the rotation.

Figure 3:
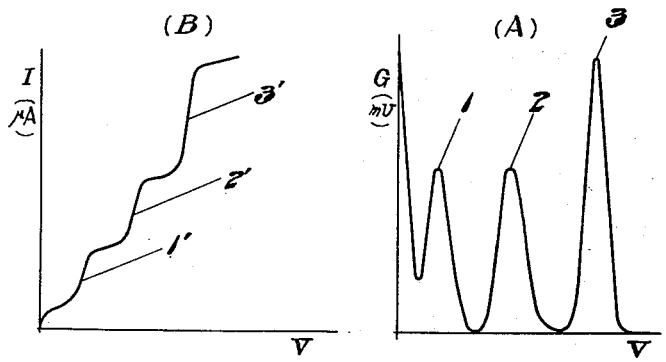
Fig. 3A illustrates an example of a derivative polarogram drawn by the present apparatus.
Fig. 3B is a view of a conventional polarogram for comparison.

Fig. 3A shows an example of a derivative polarogram recorded by means of the present instrument. Fig. 3B is an ordinary polarogram drawn from an ordinary polarograph. That is to say, the electric conductivity measured by this instrument is so high that the jumping part of the ordinary polarogram will become a peak in the derivative polarogram and its peak points 1, 2 and 3 will just coincide with the half wave points 1', 2' and 3' in the ordinary polarogram. The lower the alternating current voltage added to the ordinary electrolytic cell is, the nearer to a perfect derivative curve this derivative polarogram will be.

In the present instrument as an alternating current bridge is formed, the slight variation of the alternating current source will have no great influence and the height will be accurately obtained as the electric conductivity. This instrument is thus very suitable to carry out quantitative chemical analysis by measuring the height of the peak. Even in the case where two or more peaks are produced, the influence of the pre-discharge substance on the peak of the post-discharge substance will be small. Therefore, even in the case where a large amount of the pre-discharge substance is contained, the post-discharge ions can be accurately analyzed.

As mentioned above, according to the present invention, by putting an alternating current bridge into a polarograph circuit, the ordinary polarogram can be derived, at the same time the derivative polarogram can be recorded with a pen and therefore quick and accurate derivative polarography can be extensively applied to chemical analysis.

Various changes and modifications may be made without departing from the spirit and scope of the present invention and it is intended that such obvious changes and modifications be embraced by the annexed claim.

Having thus described the invention, what is claimed as new and desired to be secured by Letters Patent, is:

A derivative polarograph comprising an electrolytic cell, an alternating current bridge connected via the respective arms thereof with said electrolytic cell, said electrolytic cell having a fine electrode for polarography, a standard resistance, a variable resistance including a wiper member therefor, a fixed resistance, a source of feeble constant alternating current voltage connected across the input of said bridge, a source of direct current voltage connected to said bridge between said electrolytic cell and said fixed resistance to superpose said alternating current voltage on said direct current voltage for application to said electrolytic cell, an amplifier connected across the output of said bridge to amplify the unbalanced output alternating current of the bridge due to sudden fluctuation of electrolytic conductivity caused when the direct current voltage reaches a value where the electrolytic current just starts flowing in the ordinary polarogram, a two-phase balancing motor connected to the output of said amplifier and connected in turn to said wiper member to regulate the position thereof on said variable resistance so as to return said bridge to a balanced condition, and recorder means for recording a derivative polarogram operated in synchronism with said motor for recording the degree of electrolytic conductivity.

References Cited in the file of this patent

UNITED STATES PATENTS

| | | |
|---|---|---|
| 2,659,047 | Cherry et al. | Nov. 10, 1953 |
| 2,769,139 | Obenshain | Oct. 30, 1956 |

FOREIGN PATENTS

| | | |
|---|---|---|
| 640,768 | Great Britain | July 26, 1950 |